United States Patent [19]

Ghyzel et al.

[11] Patent Number: 5,521,268
[45] Date of Patent: May 28, 1996

[54] ODOR REDUCTION IN TONER POLYMERS

[75] Inventors: Peter J. Ghyzel; Paul Mitacek; Dennis E. Smith, all of Rochester, N.Y.

[73] Assignee: Eastman Kodak Company, Rochester, N.Y.

[21] Appl. No.: 412,643

[22] Filed: Mar. 29, 1995

[51] Int. Cl.[6] ............................... C08F 2/38; C08F 4/28; C08F 220/10; C08F 212/08

[52] U.S. Cl. ................. 526/224; 526/235; 526/328.5; 526/347

[58] Field of Search .................... 526/224, 235, 526/328.5, 347

[56] References Cited

U.S. PATENT DOCUMENTS

| | | | |
|---|---|---|---|
| Re. 31,072 | 11/1982 | Jadwin et al. | 430/99 |
| 2,229,513 | 1/1941 | Lustig | 217/60 |
| 2,932,629 | 4/1960 | Wiley | 260/91.5 |
| 3,374,287 | 3/1968 | Greenlee | 260/836 |
| 3,893,935 | 7/1975 | Jadwin et al. | 252/62.1 |
| 3,962,197 | 6/1976 | Khanna | 526/79 |
| 4,035,321 | 7/1977 | Shahidi et al. | 260/22 |
| 4,068,061 | 1/1978 | Nakagawa et al. | 526/68 |
| 4,079,014 | 3/1978 | Burness et al. | 252/62.1 |
| 4,089,472 | 5/1978 | Siegel et al. | 241/5 |
| 4,130,518 | 12/1978 | Rybny et al. | 260/22 |
| 4,160,644 | 7/1979 | Ryan | 23/230 B |
| 4,260,398 | 4/1981 | Ranshoff | 55/41 |
| 4,323,632 | 4/1982 | Berdan et al. | 428/626 |
| 4,414,152 | 11/1983 | Santilli et al. | 260/185 |
| 4,415,533 | 11/1983 | Kurotori et al. | 422/4 |
| 4,416,965 | 11/1983 | Sandhu et al. | 430/109 |
| 4,450,261 | 5/1984 | Chiao et al. | 526/214 |
| 4,517,272 | 5/1985 | Jadwin et al. | 430/110 |
| 4,544,768 | 10/1985 | Knee et al. | 564/206 |
| 4,625,624 | 12/1986 | Adams | 91/375 |
| 4,632,975 | 12/1986 | Cornell et al. | 528/354 |
| 4,758,491 | 7/1988 | Alexandrovich et al. | 430/110 |
| 4,788,314 | 11/1988 | Hay et al. | 558/32 |
| 4,912,009 | 3/1990 | Amering et al. | 430/137 |
| 4,971,879 | 11/1990 | Kimura et al. | 430/106.6 |
| 5,004,015 | 4/1991 | Amrhein et al. | 137/625.68 |
| 5,189,102 | 2/1993 | Tsubuko et al. | 525/112 |
| 5,192,637 | 3/1993 | Saito et al. | 430/109 |
| 5,217,836 | 6/1993 | Takiguchi et al. | 430/106.6 |

FOREIGN PATENT DOCUMENTS

| | | |
|---|---|---|
| 2525413 | 1/1976 | Germany . |
| 48-096832 | 12/1973 | Japan . |
| 50-32381 | 6/1975 | Japan . |
| 63-125502 | 5/1988 | Japan . |
| 3207367 | 9/1991 | Japan . |
| 3277602 | 12/1991 | Japan . |
| 4093308 | 3/1992 | Japan . |
| 4161403 | 6/1992 | Japan . |
| 5247893 | 9/1993 | Japan . |
| 935509 | 10/1980 | U.S.S.R. . |
| 1420839 | 5/1973 | United Kingdom . |
| 1501065 | 7/1976 | United Kingdom . |

*Primary Examiner*—Joseph L. Schofer
*Assistant Examiner*—Wu C. Cheng
*Attorney, Agent, or Firm*—Carl F. Ruoff

[57] ABSTRACT

The present invention is a process for making an electrophotographic toner binder. The toner binder has reduced mercaptan odor at elevated temperatures. The toner binder is formed by mixing monomers in a ratio that determines the final composition of the polymer or toner binder and contacting the monomers with air or oxygen. A chain transfer agent and polymerization initiator are added to the monomers. A suitable suspension polymerization type aqueous phase is prepared. The aqueous and monomer phases are blended and sheared to form monomer droplets, the mixture is suspension polymerized by heating and the aqueous phase is removed from the polymer beads.

6 Claims, No Drawings

ODOR REDUCTION IN TONER POLYMERS

FIELD OF THE INVENTION

The present invention relates to electrophotography and more particularly to the formation of a toner resin that has a reduced mercaptan odor at elevated temperatures.

BACKGROUND OF THE INVENTION

There are a number of toner resin characteristics which are influenced by molecular weight and architecture. For example, the molecular weight and degree of branching of the toner resin directly affect melt viscosity, melt elasticity, toner keeping, photoconductor scumming and grinding characteristics. Therefore, it is desirable to control the molecular weight and molecular architecture of electrophotographic binder polymers quite precisely. One of the most effective ways to achieve this control over molecular weight and chain architecture is through the well-known use of mercaptan-type (RSH) chain transfer agents which are added directly to the monomer mixture prior to initiation of the polymerization reaction. These types of chain transfer agents possess high transfer coefficients for styrene-based systems such as commonly used in the electrophotographic industry. Thus, they provide excellent control over polymer molecular weight and branching when they are used in conjunction with a crosslinking agent such as divinylbenzene.

Additionally, these RSH-type chain transfer agents are quite effective when used with azo-type initiator systems which are the preferred initiators for suspension polymerizations. However, the use of RSH-type chain transfer agents creates a significant problem. The mercaptan groups are incorporated into the polymer chains mainly as sulfide (RS-P, where P=the polymer chain) end groups as a necessary consequence of their chain-transfer activity (see Reaction 1 below).

$$RSH+P\cdot \rightarrow RS\cdot +PH \quad RS\cdot +M \rightarrow RSM\cdot \text{(new chain)} \quad (M=\text{monomer}) \qquad (1)$$

As long as these sulfur species are incorporated into polymer chains their vapor pressure is low. However, in toner manufacture the binder polymers are subjected to high temperatures and shear resulting in degradation of the polymer molecular weight. This phenomenon can lead to the regeneration of free thiol compounds from the chain ends as well as other thiol-containing species which may be present in much lower molecular weight fractions than originally envisioned. Some of these thermally generated species are low enough in molecular weight to possess appreciable vapor pressures, particularly when present in high heat areas of copiers such as the fusing station. Since these thiols have strong, objectionable odors typical of most sulfur compounds their volatilization presents an environmental problem for the users of toners containing these impurities. These sulfur compounds can have odor thresholds as low as two parts per billion. Additionally, these thermally generated thiol compounds can further be oxidatively degraded to yield sulfur dioxide ($SO_2$) a highly volatile, malodorous gas which can cause severe respiratory distress. Thus, in order to produce a low odor toner with molecular architecture control through mercaptan-mediated chain transfer it is necessary to minimize the presence of the low molecular weight mercaptans as well as their oxidation products. Since odor thresholds are so low for these compounds and the compounds are released or formed upon heating it is difficult, if not impossible to achieve odor-free polymer by conventional purification methods, that is by washing, slurrying, etc.

One approach to reduce odors is to use a high molecular weight mercaptan or to make the molecular weight of the mercaptan higher by reacting it with substances that do not effect its molecular weight modifying character. This approach prevents odors by making the mercaptan less volatile. Examples of this approach are found in JP 92 161,403 where odorless latexes were produced using t-dodecanethiol as the chain transfer agent; JP 92 93,308 in which odorless rubber modified styrene polymers were produced using t-dodecanethiol; U.S. Pat. No. 4,450,261 in which low molecular weight styrene maleic anhydride copolymers were produced using 3-mercaptopropionic acid or methyl ester of 3-mercaptopropionic acid as the chain transfer agent; DE 2,525,413 in which t-butyl mercaptan is used in the grafting step during preparation of ABS resins and found to give lower odors than either propyl or isopropyl mercaptan; JP 75 32,281 in which low odor acrylonitrile-butadiene copolymers using n-dodecyl mercaptan in combination with 1,4-cyclohexadiene; and finally JP 73 96,832 in which odorless acrylic fibers were obtained using thioglycerol as the chain transfer agent during synthesis.

Another approach is to react the mercaptan and convert it to an odor-free moiety. Examples of this approach are found in JP 93 247,893; JP 91 277,602; JP 91 207,367; EP 147,949; DE 3,546,680 and U.S. Pat. No. 3,374,287.

A third approach to remove residual mercaptans and low molecular weight mercaptan adducts is by post process distillation as in DE 2,611,222.

The above cited methods all teach methods of reducing odors due to mercaptans. However, none of these are applicable to the reduction of mercaptan odor in polymers synthesized for use as toner binders. Therefore, there is a need for an invention which reduces the odor occurring in toner binders.

The present invention solves the above-identified problem by synthesizing mercaptan odor-free polymers for use as toner binders.

SUMMARY OF THE INVENTION

The present invention is a method of making a toner resin having a chain transfer agent. The method includes mixing monomers that can undergo a free radical polymerization. The monomers are then oxygenated. A chain transfer agent and a polymerization initiator is added to the monomers to form a mixture either before or after the oxygenation. The mixture of monomers, chain transfer agent and polymerization initiator are subjected to suspension polymerization to form a toner resin wherein the mercaptan odor of the toner resin is reduced at elevated temperatures.

DESCRIPTION OF THE PREFERRED EMBODIMENTS

The present invention is not limited to a particular type of suspension polymerization reaction; however, a limited coalescence reaction is preferred. Limited coalescence is a term that refers to a specific type of suspension polymerization.

In emulsion polymerization, the reaction mixture has an organic phase that includes the monomer, crosslinker, and chain transfer agent; and an aqueous phase that includes a surfactant and an initiator for the addition reaction. The two phases are mixed together and the polymerization initiator is activated, typically by heating, and the polymerization occurs resulting in a polymer latex with submicron polymer particles.

In contrast, in suspension polymerization the organic phase includes monomer, crosslinker or chain transfer agent and the initiator. The second phase is aqueous. The organic phase is dispersed as droplets within the aqueous matrix. The size of the droplets is determined by a variety of criteria, particularly the choice of materials to be used as stabilizing agents in combination with a shearing action, typically from rapid stirring. It should be noted that typically in emulsion polymerization the initiator is in the water phase and the resulting polymer particles are less than one micrometer while in suspension polymerization, the initiator is in the organic (monomer) phase and the resulting polymer particles are greater than one micrometer, most typically 10 to 1000 micrometers.

In a preferred embodiment of the invention, the suspension polymerization procedure follows the procedures disclosed in U.S. Pat. No. 4,912,009. The water insoluble reactants; monomer, crosslinker, polymerization initiator and chain transfer agent, are mixed together and then dispersed into an aqueous medium containing a water dispersible but water insoluble suspending agent. The suspending agent or stabilizer is a negatively charged, solid colloidal material such as clay or colloidal silica. The suspending agent is used with a water soluble promoter that affects the hydrophobic-hydrophilic balance of the solid colloidal particles by forming a complex with the suspending agent. The promoter has both hydrophilic and hydrophobic groups and reduces the hydrophilicity of the suspending agent. As stated in U.S. Pat. No. 2,932,629, the promoter drives the particle of the solid colloid to the liquid interface of the oleophilic monomer droplets and the aqueous phase. The colloidal particles have dimensions from about 1 to 100 nanometers and preferably from about 5 to 70 nanometers. The size and concentration of these particles largely controls the size of the polymer particles.

Hydrophilic colloidal silica useful as the suspending agent is available commercially, for example, under the trade names and in the particle sizes as follows: LUDOX TM, 20 nm; LUDOX HS-40, 12 nm; LUDOX SM, 7 nm; and LUDOX AM, 12 nm; all supplied by E. I. du Pont de Nemours Company; and NALCOAG 1060, 60 nm. supplied by Nalco Chemical Company.

A material useful as the promoter is a condensation product of about 2 to 6 carbon alkyl dicarboxylic acid and an alkanol amine. A current preferred diacid is adipic acid. It is currently preferred that the alkanol groups of the alkanol amine have from about 1 to 4 carbons. Particularly preferred are diethanolamine and methyl amino ethanol. With adipic acid, these form polymers that complex with hydrophilic silica and then coat the hydrophobic droplets.

It is also desirable that a water soluble material be added that prevents polymerization in the aqueous phase. Examples of such materials are; sodium nitrate, copper salts, methylene blue and phenols. A currently preferred material is potassium dichromate.

The free radical initiator is soluble in the mixture of monomer and crosslinker and chain transfer agent. Examples of such initiators include azo compounds such as 2,2'-azobis(2-methylbutyronitrile), 2,2'-azobis(isobutyronitrile). Commercially available products include VAZO 67, VAZO 64, and VAZO 52 marketed by du Pont and Perkadox AMBN from Akzo Chemical Inc. Other commonly used polymerization initiators for suspension polymerizations include peroxides and peroxyesters, for example benzoyl peroxide, lauroyl peroxide and t-butyl peroxy-2-ethyl hexanoate and the like. Preferred are the azo initiators.

In a particular embodiment of the method of the invention, the oxygenated monomer, crosslinker, chain transfer agent and the initiator are first combined to provide an initial reaction mixture which is then added to an aqueous dispersion of the stabilizing agents. The initial reaction mixture is added to the aqueous mixture with high shearing agitation to obtain a suspension of monomer droplets. The high shearing forces reduce the size of the monomer droplets. An equilibrium is reached in which the size of the droplets is stabilized or limited by the suspending agent complex which coats the surfaces of the droplets.

The mixture is then heated and stirred in the reaction vessel to polymerize the monomer droplets. The resulting polymer beads are optionally vacuum distilled to strip residual monomers and then isolated by filtration and can, if desired, be rinsed or slurried with water to remove water-soluble impurities and free suspending agent complex. No extensive washing or other purification is needed.

The polymer is the polymerization product of the vinyl type monomer, crosslinker, and chain transfer agent. The relative concentrations of the crosslinker and chain transfer agent can be varied over a considerable range.

One or more vinyl type monomers can be used. Although certain monomers are preferred, namely styrene and butyl acrylate, the method of the invention is not limited to those monomers and can utilize other monomers which are capable of addition polymerization and which yield polymers useful as toner binders. Examples of suitable vinyl monomers include styrene, alpha-methylstyrene, para-chlorostyrene, vinyl toluene, unsubstituted or substituted monocarboxylic acids having a double bond such as acrylic acid, methyl acrylate, ethyl acrylate, butyl acrylate, dodecyl acrylate, octyl acrylate, phenyl acrylate, methacrylic acid, methyl methacrylate, ethyl methacrylate, butyl methacrylate, 2-ethylhexyl methacrylate, 2-ethylhexyl acrylate, octyl methacrylate acrylonitrile, methacrylonitrile, and acrylamide; unsubstituted or substituted dicarboxylic acids having a double bond such as maleic acid, butyl maleate, methyl maleate, and dimethyl maleate; vinyl esters such as vinyl chloride, vinyl acetate, and vinyl benzoate; olefins such as ethylene, propylene, and butylene; vinyl ketones such as vinyl methyl ketone and vinyl hexyl ketone; vinyl ethers such as vinyl methyl ether, vinyl ethyl ether, and vinyl isobutyl ether.

In a currently preferred embodiment of the invention, the largest component of the monomer composition is styrene or a styrene homologue such as methyl styrene or vinyl toluene. The composition also contains at least one alkyl acrylate or methacrylate. Preferably, this is a lower alkyl acrylate or methacrylate, in which the alkyl group contains from 1 to about 4 carbon atoms.

The crosslinker contains one or more compounds each having two or more double bonds capable of polymerization. Examples of suitable crosslinkers include: aromatic divinyl compounds such as divinylbenzene, and divinyl naphthalene; carboxylic acid esters having two double bonds such as ethylene glycol diacrylate, ethylene glycol dimethacrylate, and 1,3-butane diol dimethylacrylate; divinyl compounds such as divinyl aniline, divinyl ether, divinyl sulfide, and divinyl sulfone; and compounds having three or more vinyl groups. Divinylbenzene is preferred.

The chain transfer agent acts as a chain terminator in the polymerization process. Suitable chain transfer agents include: mercaptans such as t-dodecanethiol, n-dodecanethiol, laurylmercaptan, and butylmercaptan.

The polymer is melt processed in a two roll mill or extruder. This procedure can include melt blending of other materials with the polymer, such as toner addenda. A preformed mechanical blend of particulate polymer particles, colorants and other toner additives can be prepared and then roll milled or extruded. The roll milling, extrusion, or other melt processing is performed at a temperature sufficient to achieve a uniformly blended composition. The resulting material, referred to as a melt product or melt slab is then cooled. For a polymer having a $T_g$ in the range of about 50° C. to about 120° C., or a $T_m$ in the range of about 65° C. to about 120° C., a melt blending temperature in the range of about 90° C. to about 240° C. is suitable using a roll mill or extruder. Melt blending times, that is, the exposure period for melt blending at elevated temperatures, are in the range of about 1 to about 60 minutes.

An optional but preferred component of the toner is colorant; a pigment or dye. Suitable dyes and pigments are disclosed, for example, in U.S. Pat. No. Re. 31,072 and in U.S. Pat. Nos. 4,160,644; 4,416,965; 4,414,152; and 2,229,513. One particularly useful colorant for toners to be used in black and white electrostatographic copying machines and printers is carbon black. Colorants are generally employed in the range of from about 1 to about 30 weight percent on a total toner powder weight basis, and preferably in the range of about 2 to about 15 weight percent.

Another commonly used additive is a charge control agent. A very wide variety of charge control agents for positive charging toners are available. A large, but lesser number of charge control agents for negative charging toners are also available. Suitable charge control agents are disclosed, for example, in U.S. Pat. Nos. 3,893,935; 4,079,014; 4,323,632 and British Patent Nos. 1,501,065 and 1,420,839. Charge control agents are generally employed in small quantities such as, from about 0.1 to about 5 weight percent based upon the weight of the toner.

The toner can also contain other additives of the type used in previous toners, including magnetic pigments, leveling agents, surfactants, stabilizers and the like. The total quantity of such additives can vary. A present preference is to employ not more than about 10 weight percent of such additives on a total toner powder composition weight basis. In a particular embodiment of the invention a waxy or olefinic additive is used at a concentration of about 0 to 5 weight percent relative to the weight of binder.

Dry styrenic/acrylic copolymer toners can optionally incorporate small quantity of low surface energy material, as described in U.S. Pat. Nos. 4,517,272 and 4,758,491. Optionally, the toner can contain a particulate additive on its surface such as the particulate additive disclosed in U.S. Pat. No. 5,192,637.

The melt product is pulverized to a volume average particle size of from about 5 to 10 micrometers. It is generally preferred to first grind the melt product prior to a specific pulverizing operation. The grinding can be carried out by any convenient procedure. For example, the solid composition can be crushed and then ground using, for example, a fluid energy or jet mill, such as described in U.S. Pat. No. 4,089,472, and can then be classified in one or more steps. The size of particles is then further reduced by use of a high shear pulverizing device such as a fluid energy mill.

The particulate produced by the pulverization has a substantially uniform volume average particle size and a polymer composition that differs from the polymer produced by the polymerization step. The molecular weight distribution is shifted. The original peak seen on molecular exclusion chromatography remains present. (The peak may have a slight change in amplitude or a slight shift in concentration.) The gel fraction or the high molecular weight soluble material is diminished and replaced by an intermediate molecular weight peak.

To apply this invention to synthesis of toner and binders, the following general procedure is used. The monomers are mixed in a ratio that determines the final composition of the polymer. Monomers are then sparged with air to saturate them with dissolved oxygen. Other means of oxygenating the monomers are contemplated in this invention. Chain transfer agent and polymerization initiator are added to the monomers either before or after sparging. Aqueous phase is prepared with the normal limited coalescence suspension polymer procedure outlined above. The aqueous and monomer phases are then blended and sheared to form monomer droplets. The mixture is polymerized by heating it to the polymerization temperature with adequate mixing. The aqueous phase is removed from the polymer beads by filtration, centrifugation and other isolation techniques.

Described below are three examples, Example 2 is a comparative example.

EXAMPLE 1

1.5 kg Process with Air Sparging

Into a 1 L beaker, 571.2 g styrene, 142.8 g butyl acrylate, 7.2 g of 55% divinylbenzene, 14.28 g 2,2'-azo bis(2-methylbutyronitrile), and 13.6 g t-dodecanethiol were added. The mixture was stirred to form a solution and then sparged for 60 minutes with air. Into a 2 L beaker 3.99 g of poly(m-ethylaminoethanoladipate) (MAEA), 0.062 g potassium dichromate, and 749.6 g water were added. After the MAEA and the potassium dichromate dissolved, 7.73 of colloidal silica (Nalcoag 1060) were added slowly to the solution.

The contents of the 1 L beaker were then added into the 2 L beaker and the resulting heterophase mixture was sheared in an air atmosphere to form droplets. This mixture was added to a 25° C. reactor which was then heated to 77° C. at 0.5° C. per minute. After six hours at 77° C. the reactor was cooled to 25° C. and drained. The resulting polymer was filtered, washed with deionized water, and air dried.

Upon heating to 230° C. there was no mercaptan odor emanating from the polymer.

EXAMPLE 2

1.5 kg Process with $N_2$ Sparging

The polymer was synthesized as in Example 1 except that the monomer solution was sparged for 1 hour in nitrogen prior to shearing, the mixing of the monomer phase with the water phase was done in a $N_2$ atmosphere, the shearing was done in a $N_2$ atmosphere, and the reaction carried out in a $N_2$ atmosphere.

Upon heating to 230° C., the polymer had a significant mercaptan odor.

EXAMPLE 3

127 kg Process with Air Sparging 56 kg of styrene, 14 kg of butyl acrylate and 0.7 kg of divinylbenzene were charged to a 20 gallon stainless steel reactor. Air was bubbled through the monomers for one hour with stirring at 20 RPM. 60 kg of the air sparged monomer mixture were added to a 100 gallon reactor along with 1.14 kg of t-dodecanethiol and 1.2 kg 2,2'-azobis(2-methyl-butyronitrile). The mixture was stirred until a solution was obtained.

In a separate drum, 335 g of MAEA and 5.25 g of potassium dichromate were dissolved in 63 kg of deionized water. 650 g of Nalcoag 1060 were then slowly added to the solution. This suspension was added to the 100 gallon reactor, and the mixture was agitated to form droplets of monomer suspended in water. The reactor was heated to 75° C., held there for 2 hours, heated to 78° C., held there for three hours, and then heated to 85° C. at which point a vacuum distillation was initiated to remove residual volatile organic materials. After three hours, the mixture was cooled, filtered, and the resulting polymer was dried in a 50° C. air oven.

Toner made from this binder did not have a mercaptan odor associated with it.

It is standard practice to eliminate dissolved oxygen from the monomers in a free radical polymerization. This is done to prevent inhibition of the polymerization caused by oxygen capturing free radicals. In the art cited in the background section, reducing dissolved oxygen concentration during binder synthesis reduced toner odor. Moreover, the prior art teaches that oxidation of mercaptans requires a catalyst or an oxidizing agent. The present invention reduces mercaptan odor by exposing the monomer mixture to oxygen without a catalyst.

While there has been shown and described what are at present considered the preferred embodiments of the invention, it will be obvious to those skilled in the art that various changes and modifications may be made therein without departing from the scope of the invention as defined by the appended claims.

What is claimed is:

1. A method of making a toner resin comprising:

forming a mixture of vinyl type monomer composition that can undergo a free radical polymerization;

oxygenating the monomers containing vinyl groups;

adding a mercaptan chain transfer agent and a polymerization initiator to the vinyl type monomer composition; and subjecting the monomer composition, chain transfer agent, crosslinker and polymerization initiator mixture to suspension polymerization to form a toner resin wherein mercaptan odor of the toner resin at elevated temperatures is reduced.

2. The method according to claim 1 wherein the vinyl type monomer composition comprises styrene and alkyl acrylate wherein the alkyl group contains 1 to 4 carbon atoms.

3. The method according to claim 1 wherein the oxygenating of the monomers containing vinyl groups comprises contacting the monomers with oxygen or air.

4. The method according to claim 1 wherein the chain transfer agent is t-dodecanethiol, n-dodecanethiol, laurylmercaptan or butylmercaptan.

5. The method according to claim 1 wherein the monomers containing vinyl groups also includes a crosslinker.

6. The method according to claim 1 wherein the polymerization initiator is 2,2'-azobis(2-methyl-butyronitrile) or 2,2'-azobis(isobutyronitrile).

* * * * *